United States Patent [19]
Feinberg

[11] Patent Number: 5,173,817
[45] Date of Patent: Dec. 22, 1992

[54] TAPE ENGAGEMENT MECHANISM FOR MAGNETIC CASSETTE TAPE INCORPORATING A BI-DIRECTIONAL OVER RUNNING CLUTCH AND IMPROVED CAPSTAN PINCH SCHEME

[75] Inventor: Howard A. Feinberg, San Jose, Calif.

[73] Assignee: R-Byte, Inc., San Jose, Calif.

[21] Appl. No.: 628,433

[22] Filed: Dec. 17, 1990

Related U.S. Application Data

[63] Continuation of Ser. No. 508,344, Apr. 12, 1990.

[51] Int. Cl.$^5$ .............................................. G11B 5/027
[52] U.S. Cl. ..................................................... 360/85
[58] Field of Search ........................ 360/85, 95, 130.23

[56] References Cited

U.S. PATENT DOCUMENTS

| | | | |
|---|---|---|---|
| 3,860,960 | 1/1975 | Akamine | 360/85 |
| 4,060,840 | 11/1977 | Umeda | 360/130.23 |
| 4,258,399 | 3/1981 | Iijima et al. | 360/85 |
| 4,408,235 | 10/1983 | Ito | 360/71 |
| 4,410,919 | 10/1983 | Umeda | 360/85 |
| 4,459,625 | 7/1984 | Kawase | 360/95 X |
| 4,510,534 | 4/1985 | Maeda | 360/10.3 |
| 4,541,024 | 9/1985 | Sieben | 360/85 |
| 4,740,850 | 4/1988 | Ogata | 360/85 |
| 4,742,407 | 5/1988 | Smith et al. | 360/95 |
| 4,757,398 | 7/1988 | Nishida et al. | 360/85 |
| 5,025,333 | 6/1991 | Feinberg et al. | 360/85 |

*Primary Examiner*—John H. Wolff
*Attorney, Agent, or Firm*—Lyon & Lyon

[57] ABSTRACT

A mechanism for registering the tape contained within a cassette around a helical-scan head drum mechanism includes a sensor for sensing the presence of the tape cassette in a proper position for beginning the process of engagement of the tape in the cassette with the head assembly in the device. A symmetrical engagement mechanism includes two tape extraction roller blocks which sit at a first disengaged position. A tape extraction roller member for engaging the tape is mounted on each tape extraction roller block. When the presence of the cassette is sensed, the tape extraction roller blocks move along a predetermined path to a second, engaged position wherein the tape is correctly positioned around the head assembly. At a predetermined position along the path, a pair of symmetrically positioned entry-and-exit positioning rollers engage the tape and move it into position for passing it by the tape heads. A pair of springs are provided to prevent jamming in the event that one tape extraction roller block arrives in its position prior to the other. In an embodiment where the device includes a helical-scan head drum assembly, stationary tape positioning pins are provided for correcting the position of the tape from the tilted plane of the helical-scan head drum assembly to the vertical plane. These pins engage the tape prior to the end of travel of the tape extraction roller blocks. The tape is also loaded around a pinch roller and tension arm, as well as velocity and tension sensors.

7 Claims, 8 Drawing Sheets

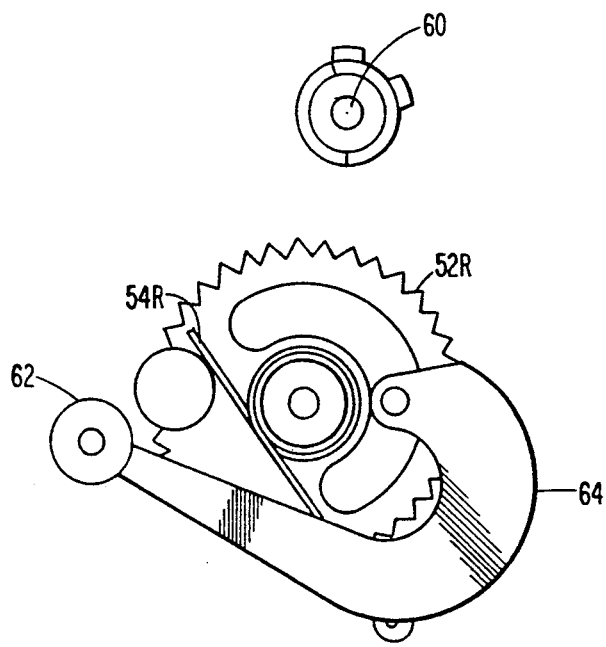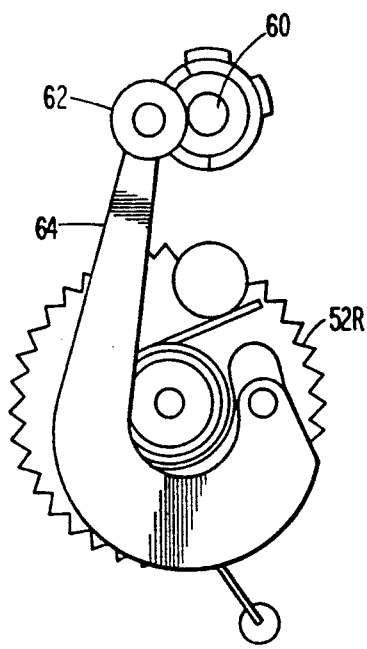
FIG. 4a.    FIG. 4b.
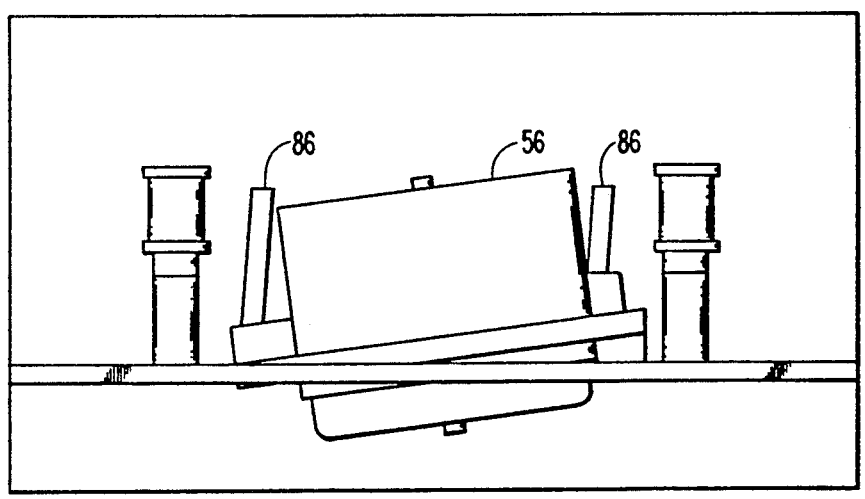
FIG. 5.

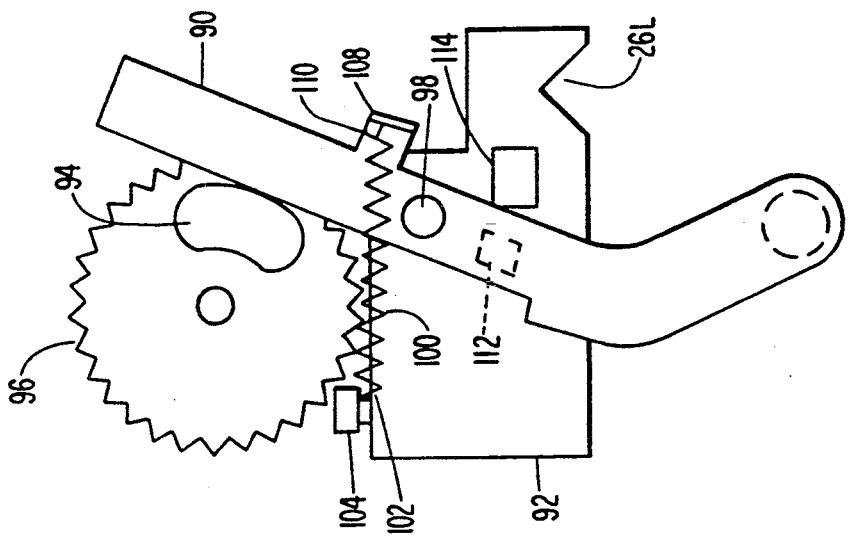
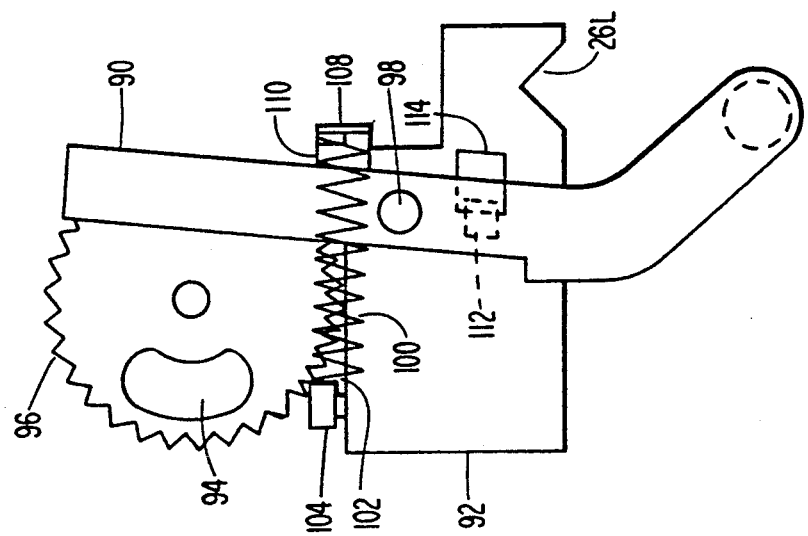

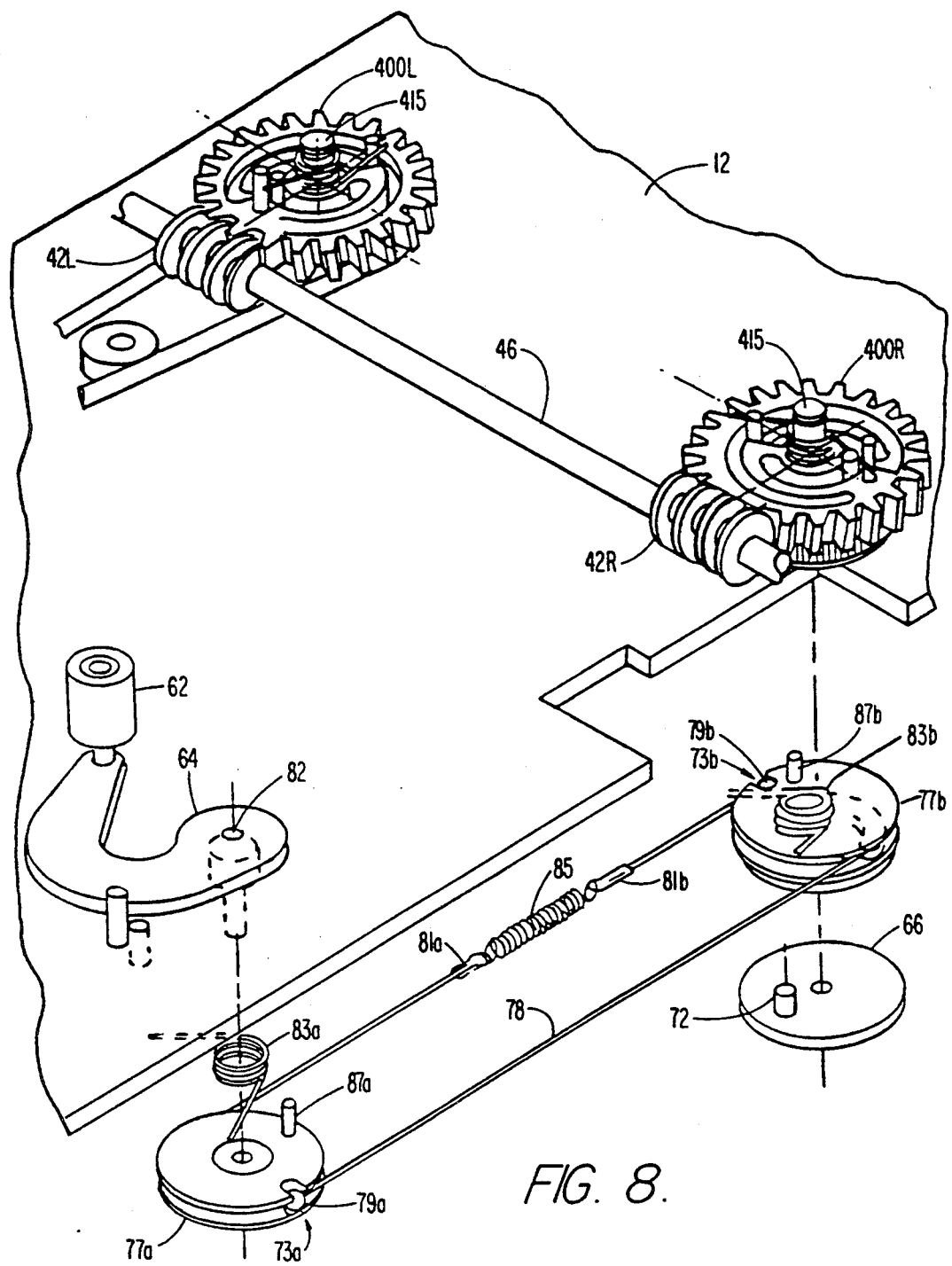

TAPE ENGAGEMENT MECHANISM FOR MAGNETIC CASSETTE TAPE INCORPORATING A BI-DIRECTIONAL OVER RUNNING CLUTCH AND IMPROVED CAPSTAN PINCH SCHEME

RELATED APPLICATION

This application is a continuation in part of copending application Ser. No. 07/508,344, filed Apr. 12, 1990, entitled, Tape Engagement Mechanism for Magnetic Cassette Tape, and assigned to the same assignee as the present invention.

BACKGROUND OF THE INVENTION

1. Field of the Invention

The present invention relates to magnetic tape drive equipment. More particularly, the present invention relates to apparatus for extracting the tape from the cassette and guiding it into engagement with the tape heads which are used to read the information from the tape.

2. The Prior Art

Mechanisms for inserting and ejecting magnetic tape cassettes from the devices in which they are utilized exist in the prior art. While these mechanisms often provide for the manual insertion of the tape cassette into the device, all such mechanisms known to the inventors utilize a motor drive for the purpose of assisting in the insertion and ejection of the tape cassette from the device once it has finished running. In such mechanisms, a power failure in the device makes the extraction of the cassette from the device difficult or impossible.

In addition, any mechanism for inserting and ejecting the cassettes must take into account the height of the tape drive hub spindles (approximately 0.30") used in the device to drive the tape reels contained within the cassettes, since the cassette must clear them when it is both inserted and ejected. The presence of the tape drive hub spindles also requires that the vertical motion of the cassette during insertion and ejection be free from any degree of lateral motion or tilt which would act to bind the cassette on the hub spindles and thus impede its motion.

Devices equipped with helical-scan heads include tape correction pins which are used to correct the orientation of the tape from the tilted plane caused by its engagement with the helical-scan head drum assembly to the vertical plane associated with the cassette. In such devices in the prior art which are known to the inventors, these pins are usually located within the tape puller roller blocks which are used to bring the tape into contact with the helical-scan head drum assembly. Because these pins are placed on the moveable tape puller roller blocks, they are more or less prone to misalignment caused by improper registration of the blocks with the drum assembly.

Prior art tape engagement devices are often exceedingly complex in order to provide the necessary timing for proper activation of all of the tape drive and engagement mechanisms. For example, a tape drive must have some lost motion in both a clockwise as well as in a counterclockwise direction, while at the same time other parts related to the tape drive and engagement mechanism must remain stationary. Accordingly, there is a need for a simplified tape drive which has lost motion in both a clockwise and a counterclockwise direction while at the same time enables other parts of the assembly to remain stationary.

Another problem in prior art devices is the need to maintain a precise timing relationship between the capstan arm pinch roller and the tape drive mechanism. Prior art devices fail to provide a simplified system for precise timing between the front capstan arm and the tape drive. This often results in uneven tension applied by the capstan arm roller against the tape which impairs the constant movement of the tape through the system and degrades sound quality.

Accordingly, there is a need for a simplified mechanism which allows the tape drive to have lost motion in both a clockwise as well as a counterclockwise direction while at the same time maintaining the constant movement of other parts related to the tape drive engagement system.

There is also a need for an improved capstan arm pinch mechanism which will maintain a constant timing relationship between the capstan arm and the drive means. Such an improved capstan arm mechanism advantageously should maintain a constant application of a precise amount of tension against a tape so that its movement through the system is not subject to deviation.

BRIEF DESCRIPTION OF THE INVENTION

According to a first aspect of the present invention, a mechanism for registering the tape contained within a cassette around a helical-scan head drum mechanism includes means for sensing the presence of the tape cassette in a proper position for beginning the process of engagement of the tape in the cassette with the head assembly in the device. A symmetrical engagement mechanism includes two tape extraction roller blocks which sit at a first disengaged position. A tape extraction roller member for engaging the tape is mounted on each tape extraction roller block. Means are provided to sense the presence of the tape cassette in a proper position for beginning the process of engagement of the tape in the cassette with the head assembly in the device. When the presence of the cassette is sensed, the tape extraction roller blocks move along a predetermined path to a second, engaged position wherein the tape is correctly positioned around the head assembly.

At a predetermined position along the path, a pair of symmetrically positioned entry-and-exit positioning rollers engage the tape and move it into position for passing it by the tape heads. Means are provided to properly position the tape in the X, Y, and Z planes at the second, engaged position of the tape extraction roller blocks. Means are provided to prevent jamming in the event that one tape extraction roller block arrives in its position prior to the other. In an embodiment where the device includes a helical-scan head drum assembly, stationary means are provided for correcting the position of the tape from the tilted plane of the helical-scan head drum assembly to the vertical plane. These means engage the tape prior to the end of travel of the tape extraction roller blocks. The tape is also loaded around velocity and tension sensors.

In accordance with an aspect of this invention, a bi-directional over running clutch is provided to enable one rotating member of the tape drive assembly to become stationary while the remainder of the tape drive assembly may be kept rotating to perform other functions.

In accordance with another aspect of the invention, an improved capstan arm biasing or pinch scheme is provided which results in a precise timing relationship between the tape, pinch roller, the capstan arm and the remaining driving members of the tape drive and engagement system. This advantageously eliminates slack in the pinch roller driving mechanism and also results in a constant amount of bias which is exerted upon the tape. The improved capstan arm pinch scheme of the present invention substantially eliminates unwanted deviations in the movement of the tape through the system.

BRIEF DESCRIPTION OF THE DRAWINGS

FIG. 4a is a drawing of a section of the engagement apparatus shown in FIGS. 1 and 2, enlarged to show the pinch roller engagement mechanism in greater detail in the unengaged position.

FIG. 4b is a drawing of the same section of the engagement apparatus as shown in FIG. 4a, enlarged to show the pinch roller engagement mechanism in greater detail in the engaged position.

FIG. 5 is a side view of the structure surrounding the head drum assembly, showing the fixed but adjustable angled pins for tape attitude correction.

FIG. 6a is a drawing of a section of the engagement apparatus shown in FIGS. 1 and 2, enlarged to show the tension arm engagement mechanism in greater detail in the unengaged position.

FIG. 6b is a drawing of the same section of the engagement apparatus as shown in FIG. 6a, enlarged to show the tension arm engagement mechanism in greater detail in the engaged position.

FIG. 8 is an exploded view of an improved capstan pinch scheme in accordance with the present invention.

DETAILED DESCRIPTION

The present invention is particularly suited for use with digital audio tape (DAT) cassettes, but, as will be appreciated by those of ordinary skill in the art, the invention may be readily adapted for use with other types of magnetic tape cartridges and cassettes. Such persons will readily understand how to scale and modify the apparatus disclosed herein for use with other tape systems.

Figure 1:
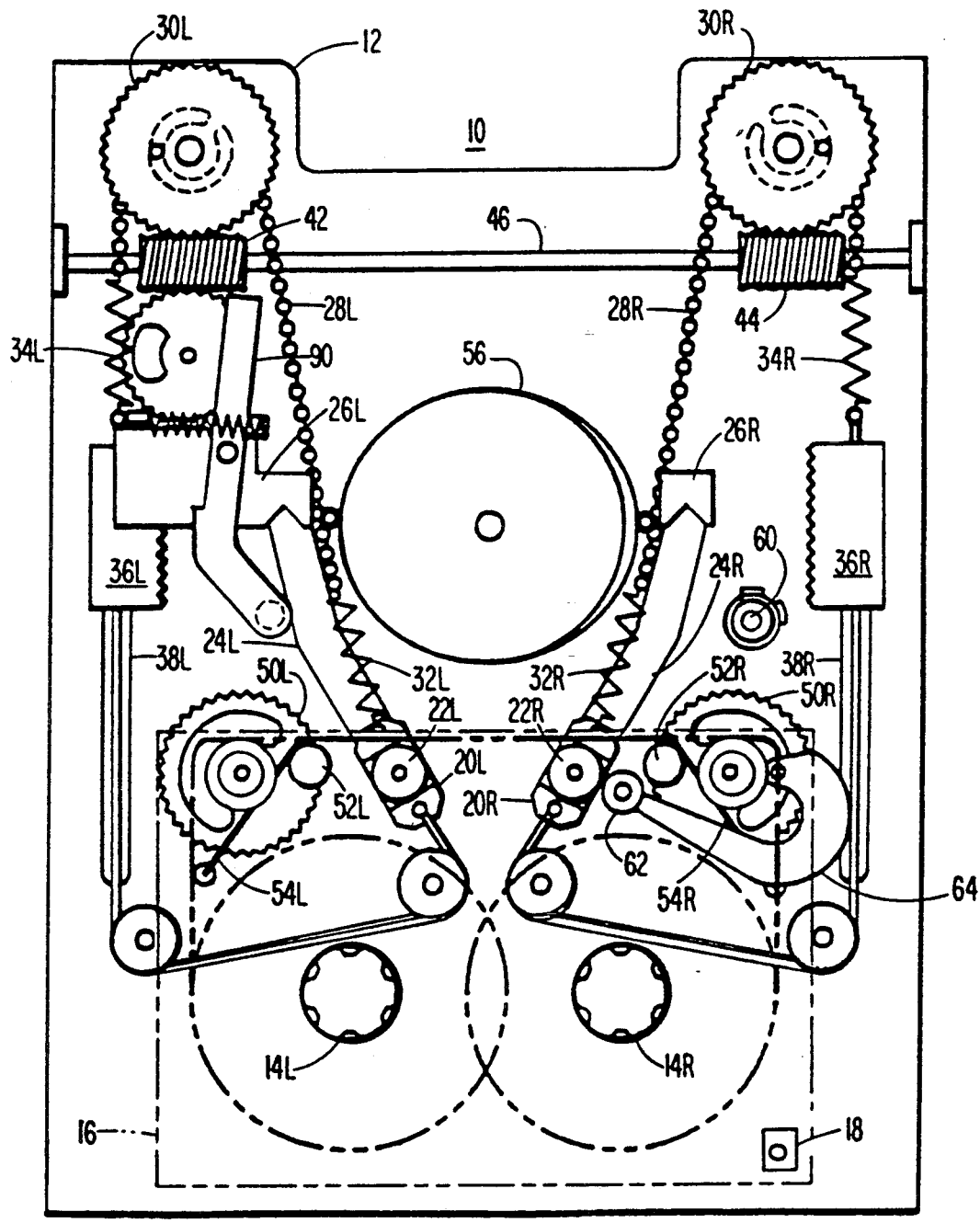
FIG. 1 is a top view of the layout of a presently-preferred embodiment of a tape engagement mechanism according to the present invention shown prior to engagement of the tape around the head drum assembly showing the positions of the elements of the engagement mechanism.
Figure 2:
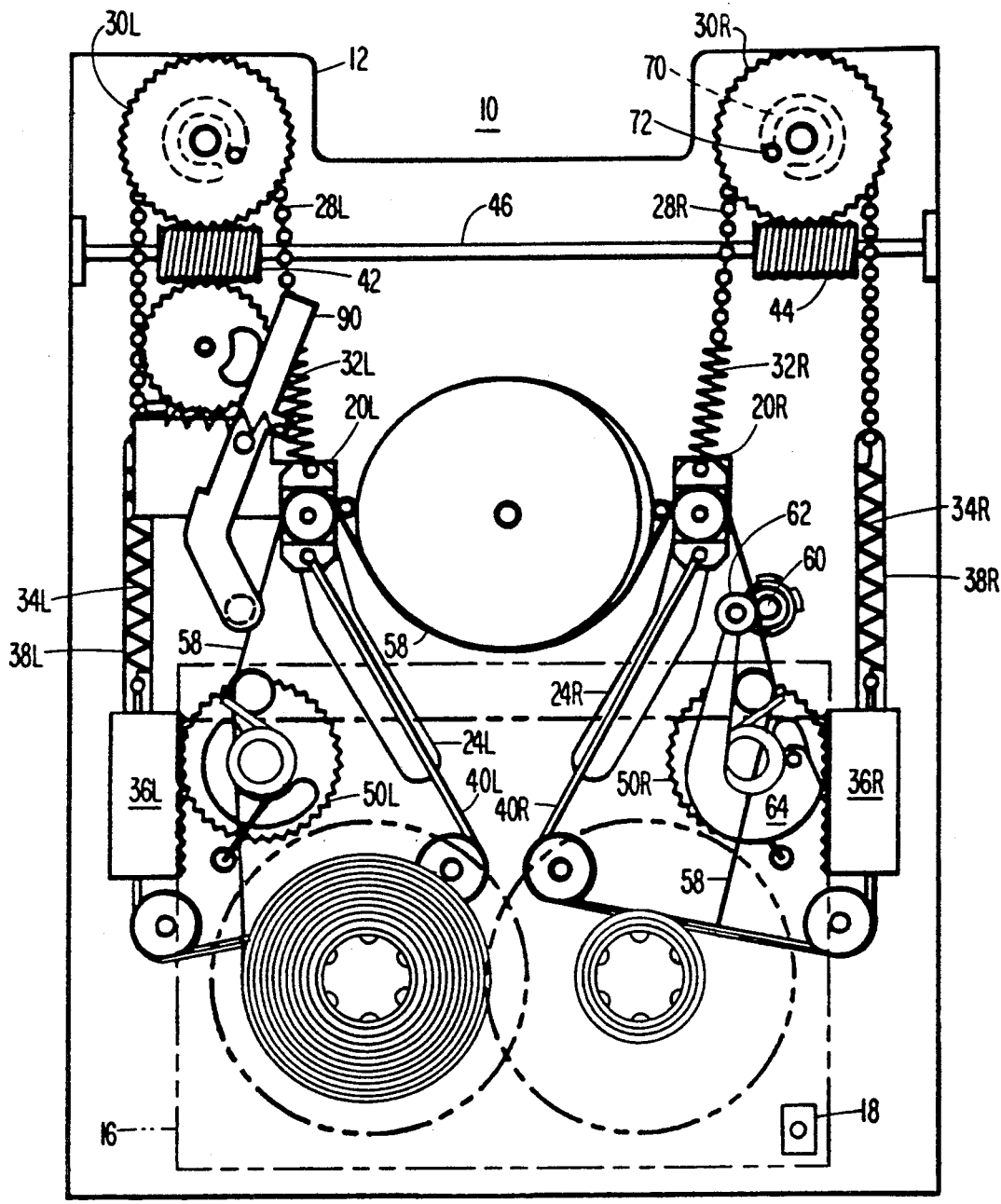
FIG. 2 is a top view of the layout of a presently-preferred embodiment of a tape engagement mechanism according to the present invention shown after engagement of the tape around the head drum assembly, showing the positions of the elements of the engagement mechanism and further showing the position of the tape with respect to the elements of the engaging mechanism.

Referring first to FIGS. 1 and 2, top views of the layout of a presently-preferred embodiment of a tape engagement mechanism according to the present invention, shown prior and subsequent to engagement of the tape around the head drum assembly, respectively, are provided to illustrate the relative engaged and disengaged positions of the elements of the engagement mechanism. The apparatus according to a presently preferred embodiment of the invention extracts a tape from the open door of a cassette when a sensor indicates the presence and correct position of the cassette in the apparatus.

An embodiment of a tape insertion and extraction apparatus 10 is mounted on a frame 12. Frame 12 may be fabricated from either metal or plastic or other suitable materials as will be apparent to those of ordinary skill in the art.

Drive spindles 14L and 14R receive the tape cassette (shown in dashed lines denoted by reference numeral 16 to indicate its position in its inserted position) and are driven by a drive motor (not shown). Means are provided for sensing the presence of the tape cassette in a proper position for beginning the process of engagement of the tape in the cassette with the head assembly in the device. In a presently preferred embodiment, a micro switch 18 is used to sense the presence of the cassette in the proper position on drive spindles 14L and 14R.

A symmetrical engagement mechanism according to a presently preferred embodiment includes left and right tape extraction roller blocks 20L and 20R. Vertically-oriented tape extraction roller members 22L and 22R are mounted on the tape extraction roller blocks for engaging the tape from cassette 16.

Left and right tape extraction roller blocks 20L and 20R ride on left and right tape extraction roller block guides 24L and 24R. Left and right tape positioning V-blocks 26L and 26R are positioned at the ends of left and right tape extraction roller block guides 24L and 24R to locate the engaged position of the tape.

In a preferred embodiment, worm wheel gears 30L and 30R are each coupled to a length of timing belt or bead chain 28L and 28R. Bead chains 28L and 28R engage chain sprocket drivers in worm wheel gears 30L and 30R, respectively, which accept its respective timing belt or bead chain 28L or 28R to provide a non-slip drive means.

Bead chains 28L and 28R are respectively coupled to one end of springs 32L and 32R and 34L and 34R, respectively. The other ends of springs 32L and 32R are coupled to tape extraction roller blocks 20L and 20R. The other ends of springs 34L and 34R are connected to one end of rack gears 36L and 36R, respectively. Rack gears 36L and 36R ride in channels or guides 38L and 38R, respectively.

The other end of rack gears 36L and 36R are coupled to one end of a length of cable 40L and 40R. The other end of cables 40L and 40R are coupled to the other end of tape extraction roller blocks 20L and 20R, respectively. Cables 40L and 40R may be lengths of steel cable, such as CF 1452, available from CMA Corporation, of Fairfield, N.J., although those of ordinary skill in the art will recognize that any cable having similar properties may be used.

As can be appreciated by those of ordinary skill in the art, the tension on the driving loops created by bead chains 28L and 28R, springs 32L and 32R, tape extraction roller blocks 20L and 20R, cables 40L and 40R, rack gears 38L and 38R, and springs 34L and 34R, respectively, may be maintained relatively constant by the action of springs 32L, 32R, 34L and 34R. In the engaged rest position (tape extraction roller blocks 20L and 20R in contact with tape positioning V-blocks 26L and 26R), springs 32L and 32R are relatively tensioned, assuring firm contact between tape extraction roller blocks 20L and 20R and tape positioning V-blocks 26L and 26R, and springs 34L and 34R are relatively untensioned. In the unengaged rest position, rack gears 36L and 36R are at the end of their travel at the upper ends of guides 38L and 38R, respectively, and springs 32L and 32R are relatively untensioned while springs 34L and 34R are relatively tensioned.

Worm wheel gears 30L and 30R are configured to be driven in opposite directions by left worm gear 42 and right worm gear 44. Left worm gear 42 and right worm gear 44 are driven from a common shaft 46 by a motor 48 (shown in FIG. 3). In a presently preferred embodiment, worm gears 42 and 44 and worm wheel gears 30L and 30R may provide a large speed reduction, such as about 50:1, which allows the use of an inexpensive, low torque motor for multiple functions.

Pinion gears 50L and 50R are mounted in the path of travel of rack gears 36L and 36R, respectively, as defined by channels or guides 38L and 38R, so as to be engaged by rack gears 36L and 36R.

Tape entry and exit positioning rollers 52L and 52R are eccentrically mounted on pinion gears 50L and 50R respectively so as to engage the tape contained in cassette 16.

The rest positions of pinion gears when unengaged by rack gears 36L and 36R are established by a spring biased stop. In a presently preferred embodiment, bias spring 54L applies a clockwise torque on pinion gear 50L and bias spring 54R applies a counter-clockwise torque on pinion gear 50R. Unengaged rest positions of pinion gears 36L and 36R may be established, as is known in the art by such means as downwardly projecting tabs on the bottom surfaces of pinion gears 50L and 50R (not shown) engaging upwardly projecting tabs formed in frame 12.

The combination of bead chains 28L and 28R, worm wheel gears 30L and 30R springs 32L and 32R, 34L and 34R, rack gears 36L and 36R and cables 40L and 40R comprise a substantially constant tensioned, non-slip drive means which performs several functions, which may be easily understood in terms of the operation of the engagement mechanism with reference to both FIGS. 1 and 2.

As shown in FIG. 1, in the unengaged rest position of the apparatus of the present invention, tape extraction roller blocks 20L and 20R are located at the lower ends of their guides 24L and 24R. Bead chains 28L and 28R are positioned close to one end of their travel such that springs 34L and 34R are positioned close to worm wheel gears 30L and 30R, respectively. Rack gears 36L and 36R are located at the upper ends of guides 38L and 38R. Springs 32L and 32R are lightly tensioned and springs 34L and 34R are tensioned. Pinion gear 50L is in its clockwise stopped rest position and pinion gear 50R is in its counter-clockwise stopped rest position. As can be seen from FIG. 1, in this position tape entry and exit positioning rollers 52L and 52R are located towards the center of the apparatus, i.e., at the three o'clock and nine o'clock positions, respectively.

When micro switch 18 indicates the presence of a tape cassette, motor 48 is activated and turns shaft 46 and left worm gear 42 and right worm gear 44, connected to shaft 46. This action causes left worm wheel gear 30L to rotate in a counter-clockwise direction and right worm wheel gear 30R to rotate in a clockwise direction.

The motion of left and right worm wheel gears causes their associated non-slip drive means to move. Thus, rack gears 36L and 36R begin to move downward along their guides 38L and 38R, and tape extraction roller blocks 20L and 20R begin to move upward along their guides 24L and 24R.

Figure 7A:
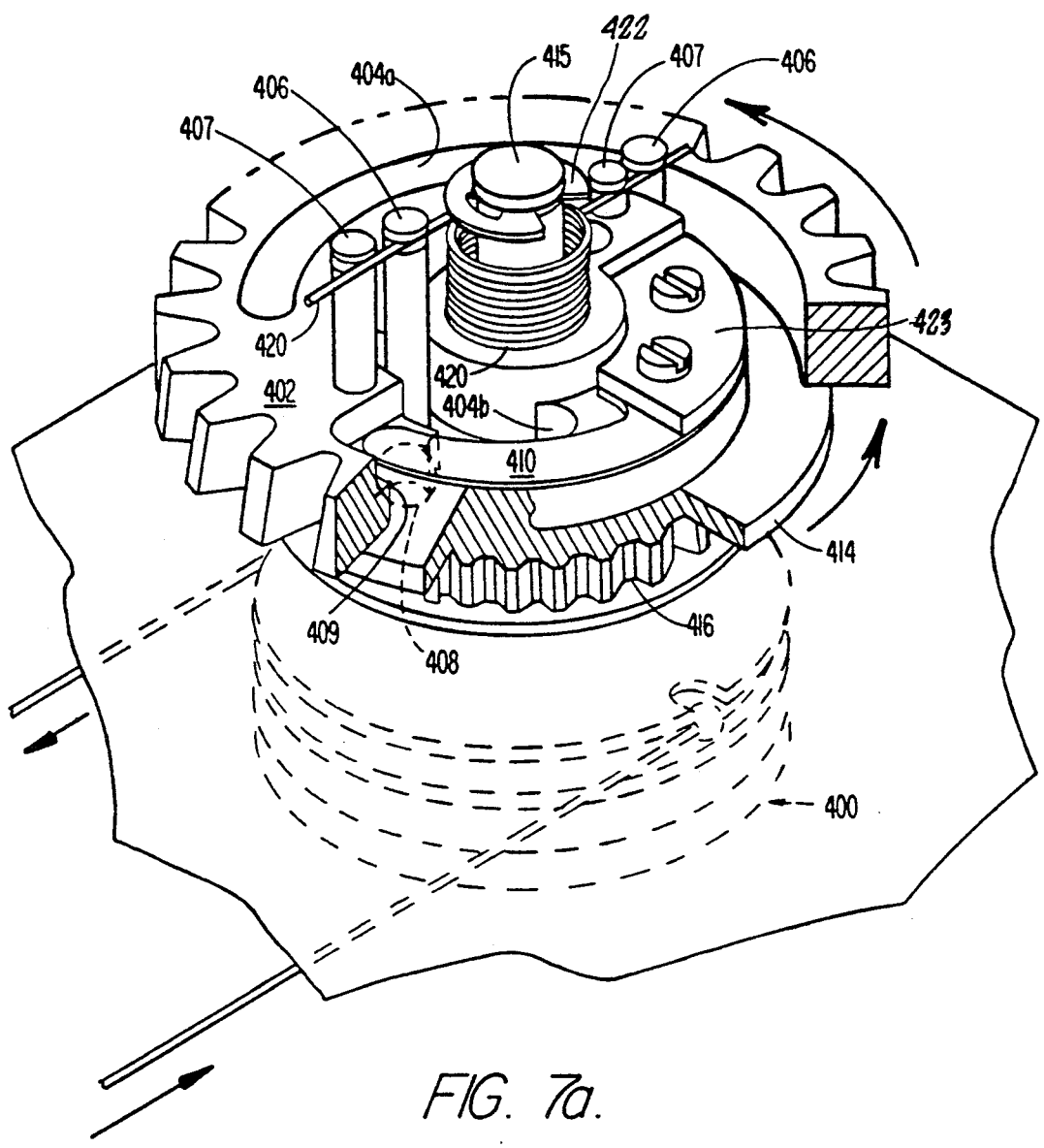
FIG. 7a is an exploded view of a bi-directional over running clutch, shown in a home condition, in accordance with the present invention.
Figure 7B:
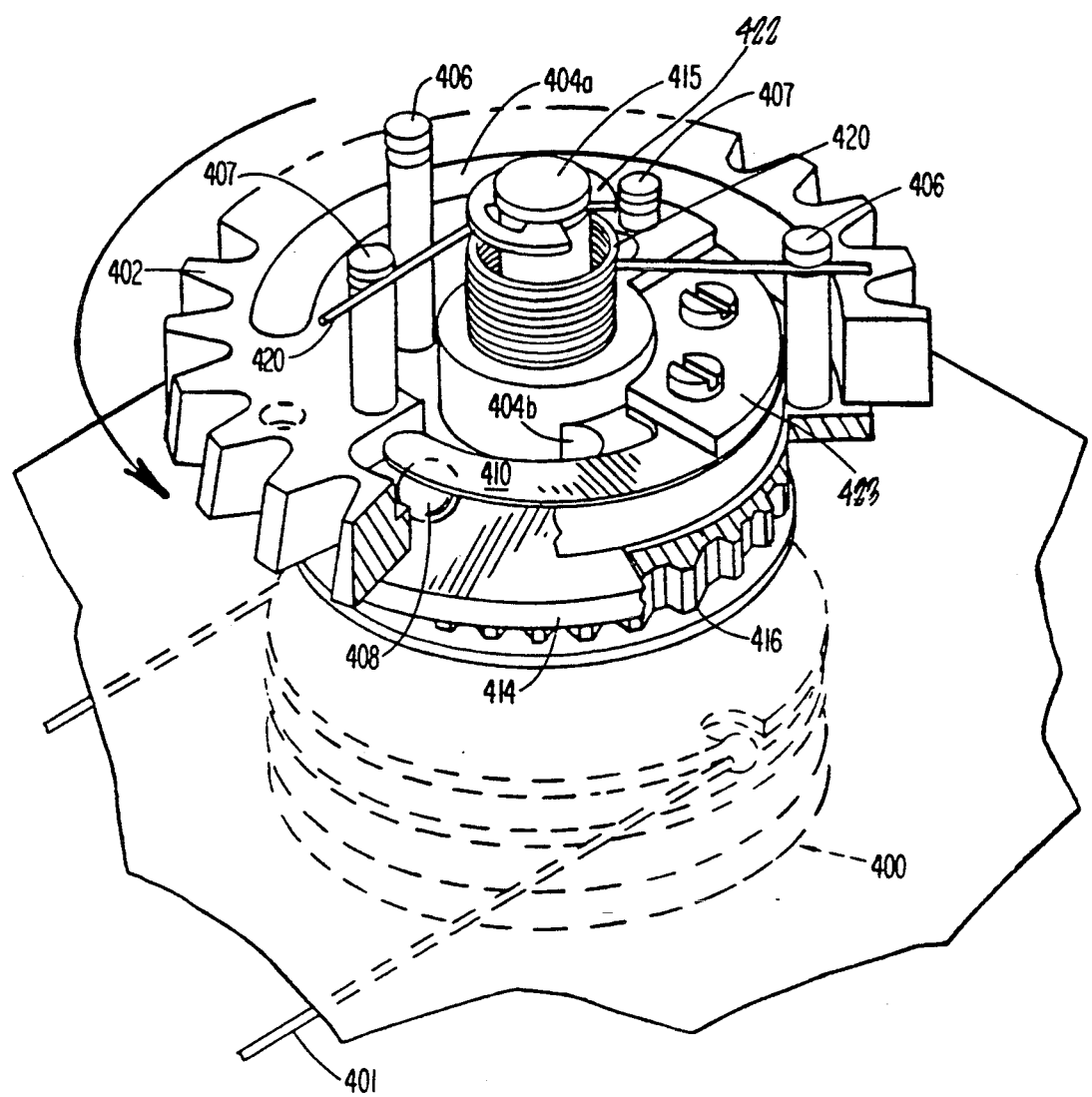
FIG. 7b is an exploded view of the bi-directional over running clutch of FIG. 7a shown in a loaded condition.

In a magnetic tape drive apparatus, a provision must be made for the tape drive to have lost motion in both a clockwise as well as a counterclockwise direction, while at the same time enabling other functions related to the tape drive and engagement mechanism to be stationary. In accordance with an alternate embodiment of this invention, a bi-directional over running clutch provides over travel in both a clockwise and counter-clockwise direction. The bi-directional over running clutch of this embodiment as shown in FIGS. 7a and 7b advantageously eliminates the need for a set of springs and belts used in the prior art to accomplish the over travel of worm wheel gears. This also advantageously eliminates the stretching and increased loading of cables or other drive means which are necessary to achieve the requisite amount of over travel for other tape drive components in the prior art.

The bi-directional over running clutch of the present invention accomplishes basically two purposes. It allows one rotating member of a given mechanical assembly to become stationary while the remainder of the assembly may be kept rotating to perform other functions.

As shown in FIGS. 7a and 7b, the bi-directional over running clutch comprises a pulley assembly 400 operatively connected to a helical gear, comprising a right or left hand worm wheel gear 402. Worm wheel gear 402 is provided with at least one slot for receiving at least one reaction pin 406 of the pulley assembly as will be further explained. In the embodiment shown, two slots 404a and 404b are offset concentrically and disposed in parallel with the circumference of the worm wheel gear 402. The slots function along with the reaction pins 406, as a means for limiting the rotation of the worm wheel gear 402 in a desired amount with respect to the timing gear 416. A driving member 408 comprising a steel or other metallic ball of precise diameter rests in a predetermined recess or aperture 409 in the surface of the adjacent pulley assembly 400. The driving member 408 functions as a coupling means for holding the worm wheel gear 402 in a desired relation to the timing gear 416 so that the worm wheel gear 402 can be selectively released or over travelled by a predetermined amount of applied force as will be explained.

It will be appreciated that the driving member 408 also acts as a positive detent clutch means for selectively enabling the worm wheel gear 402 to rotate while the pulley remains stationary. The driving member 408 is held in place by means of a thin cantilever spring 410 which also acts as a means for applying a predetermined amount of bias to the driving member 408. A driving member reaction plate 414 is fixed to the timing gear 416. As is well-known in the art, a timing belt pulley may be substituted for the timing gear 415. In a preferred embodiment, the timing gear 416 has approximately 22 teeth with a 0.08 pitch. However, any suitable timing gear may be substituted.

The worm wheel gear 402 is pressed onto a main shaft 415. The main shaft 415 is piloted down through timing gear 416 and pulley assembly 400. The driving member 408 or positive detent clutch means is inserted between the worm wheel gear 402 and the reaction plate 414. The cantilever spring 410 functions as a means for selectively retaining the positive drive member 408 in its recess 409 as will be explained. As long as the driving member 408 is maintained in the recess 409, the driving member provides a means for coupling together the worm wheel gear 402 and timing gear 416.

At least one reaction pin 406 is mounted to the pulley assembly 400, and at least one reaction pin 407 is disposed on the top surface of the worm wheel gear 402. As shown in FIGS. 7A and 7B, the reaction pins 406 and 407 provide a means for engaging and for loading a torsion spring 420. The reaction pulley assembly pins 406 are fixedly disposed in the top surface of reaction plate 414 and protrude out through the slots 404a, 404b past the top surface of the worm wheel gear 402. The pulley assembly reaction pins 406 are preferably the same height as the worm wheel gear reaction pins 407 which are fixedly disposed in the top surface of the worm wheel gear 402 as shown in FIGS. 7A and 7B.

Torsion spring 420 may be a left or right hand torsion spring of precisely calculated torque. The torsion spring 420 is restrained on top of the worm wheel gear 402 between the pulley assembly reaction pin 406 and the reaction pin 407 of the worm wheel gear 402. A mandrel 422 or similar means for axially retaining the torsion spring 420 in place is pressed onto the top of the main shaft 415.

A fastening plate 423 or other fastening means is provided for holding the cantilever spring 410 in place on worm wheel gear 402. Alternatively, cantilever spring 410 may be bonded in place.

It will be appreciated that upon rotation of the worm wheel gear 402, a positive drive of known force is developed, thus turning both the worm wheel gear 402 and the timing gear 416 together. That is, since the steel ball or driving member 408 is restrained by the cantilever spring 410 between the worm wheel gear 402 and the reaction plate 414, the driving member 408 thus functions as a positive detent clutch means for coupling together both the worm wheel gear 402 and pulley assembly 400 which is fixedly attached to the reaction plate 414. The worm wheel gear 402 and timing gear 416 thus rotate in unison.

It will be appreciated that the torsion spring 420 exerts no torque in this instance since both the worm gear reaction pins 407 and the pulley assembly reaction pins 406 are rotating at the same velocity and in unison. The purpose of the timing gear 416 is to drive the timing belt, as previously explained, which is connected to all the other elements of the tape engagement system thus causing them to move as the timing gear 416 turns. In the event that some of the additional linear elements which make up the tape engagement assembly must come to a stop induced by extraneous influences such as a power outage or the end of the tape, etc., it is necessary that the timing gear 416 must also stop turning.

The positive detent clutch means of this invention advantageously allows the timing gear 416 to stop rotating while simultaneously enabling the worm wheel gear 402 to travel in a desired direction. That is, the positive drive member 408 is positioned by the cantilever spring 410 such that it can be released by an applied external force which stops the rotation of the timing gear 416.

The amount of external force necessary to release the drive member 408 can be precisely regulated by adjusting the tension of the cantilever spring 410. That is, when a predetermined amount of torque, applied in the opposite direction of rotation, overcomes the bias applied by the cantilever spring 410 to the drive means 408, the drive means 408 is forced out of the recess 409 and releases the pulley assembly from the worm wheel gear 402. When the rotation of the timing gear 416 must be stopped for whatever reason, this causes the driving member 408 to move out of the recess 409 in the retaining plate 414. At this time, the reaction pins 406 of the pulley assembly 400 will stop turning. However, since the reaction pins 407 of the worm wheel gear 402 will continue to rotate, the ends of torsion spring 420 will engage the worm wheel gear reaction pins 407 and the torsion spring 420 will start to wind up and be placed in a loaded condition. The loaded torsion spring 420 thereby causes a force to be developed against the reaction pin 406 that has stopped rotating. This in turn causes the application of a torque and subsequent force to be developed on the belt 401 of timing gear 416. This force is required to maintain positive registration of one of the linear moving elements of the tape engagement system into its registration point.

It will be appreciated that this same continued rotation provides the motion that causes the capstan mechanism to develop a pinch force to drive the tape as will be explained infra. Upon completion of the recording process, the system according to the this embodiment reverses the direction of rotation and returns to its starting position where a linear element of the tape transport system contacts another stop. This causes the same set of circumstances described previously to occur in the opposite direction allowing the manual loader for the tape cartridge to eject automatically without the use of a separate motor.

It will be appreciated that the foregoing embodiment provides an extremely compact system which achieves at least a 50% savings in space over the prior art.

As the motion of the foregoing elements progresses, the tape (shown in FIG. 2 at reference numeral 58) is first engaged by tape entry and exit positioning rollers 22L and 22R and is pulled in an upward direction towards head drum assembly 56. In addition, when racks 36L and 36R engage pinion gears 50L and 50R, pinion gear 50L begins to rotate in a counter-clockwise direction and pinion gear 50R begins to rotate in a clockwise direction. At a predetermined position along the rotational path of pinion gears 50L and 50R, tape entry and exit positioning rollers 52L and 52R engage the tape and pull it in generally opposite and outward directions to a final position shown in FIG. 2.

At the end of their travel, tape extraction roller blocks 20L and 20R contact left and right tape positioning V-blocks 26L and 26R which stop their motion and finally position them. As shown in FIG. 2, in the fully engaged position, tape extraction roller blocks 20L and 20R are held against left and right tape positioning V-blocks 26L and 26R by the tension in springs 32L and 32R, respectively. When the upward motion of tape extraction roller blocks 20L and 20R stops, the motion of rack gears 36L and 36R also stops, since they are coupled together by inelastic cables 40L and 40R.

One embodiment of the present invention includes a capstan 60, which may be driven by a suitable servo motor as is well known in the art. Tape 58 is engaged and forced against capstan 60 by pinch roller 62, mounted on pinch roller arm 64.

Figure 3:
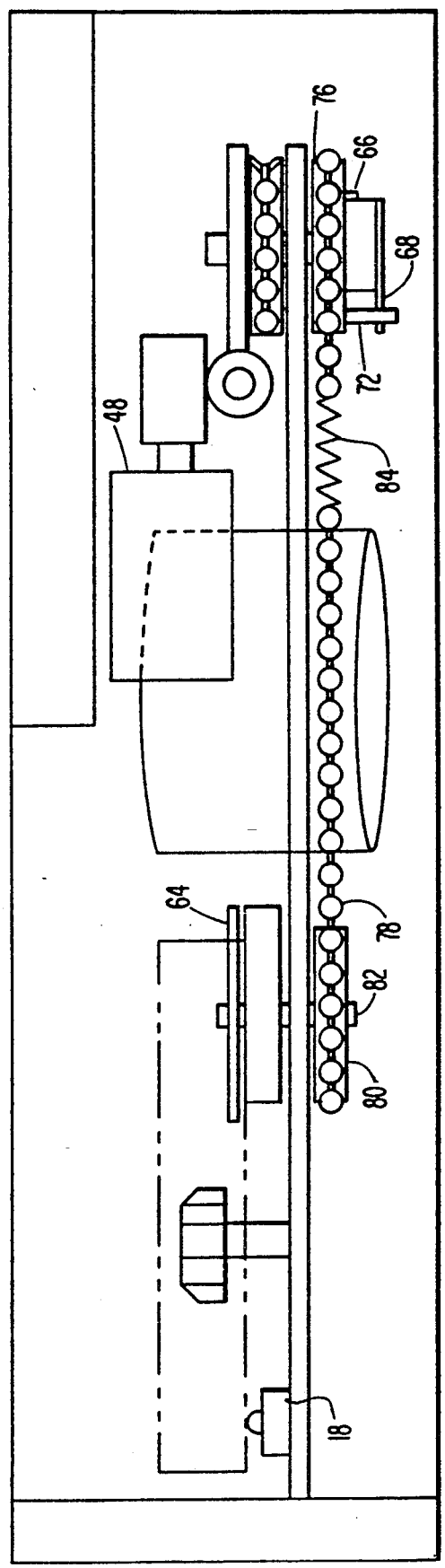
FIG. 3 is a right side view of the engagement mechanism shown in FIGS. 1 and 2, showing the pinch roller arm drive mechanism.

The driving mechanism for pinch roller arm 64 is best understood with reference to FIGS. 3, 4a and 4b. The pinch roller arm driving mechanism may be located on the underside of frame or base plate 12 and, in one embodiment, includes a driving plate 66 mounted on the same shaft as right worm wheel gear 30R in a free wheeling manner and is connected to torsion spring 68 which attempts to maintain it in a home position. Right worm wheel gear 30R has a partially circumferential groove 70 which engages a pin 72 in driving plate 66. Driving plate 66 will not move until pin 72 completely traverses groove 70 and engages its edge. The purpose of groove 70 and pin 72 is to provide a fixed delay for the motion of pinch roller arm to allow the tape to reach the proper position before being engaged by the capstan 60.

Pulley 77b accepts a driving means such as a timing belt, cable or bead chain 78 which engages sprocketed driven pinch roller arm wheel 80 mounted on a shaft 82 which forms the pivot point for pinch roller arm 64. When sprocketed driven pinch roller arm wheel 80 turns, pinch roller arm 64 moves.

The driving means may be biased with a spring 84 so that when the pinch roller on pinch roller arm 64 traps the tape against capstan 60, driving plate 66 is allowed to overtravel by a predetermined amount and thus stretch the spring 84, which provides a predictable pinch force.

Those of ordinary skill in the art will recognize that, if desired, the angular displacement of groove 70 may be distributed among driving wheel 66 and pinch roller arm wheel 80 to provide the same delay. In such a case, an engaging pin must be provided on a member associated with pinch roller arm 64.

An alternate embodiment showing an improved capstan biasing system is shown in FIG. 8. A pinch roller 62 for contacting a capstan 60 (as shown in FIG. 2) is disposed on the distal end of a capstan arm 64. The capstan arm 64 is connected to a pulley assembly comprising a front capstan arm pulley 77a and rear floating pulley 77b located on the lower side of the base plate 12. A torsion spring 83a provides a means for applying rotational force in a direction opposite to the rotation of the pulley assembly. Torsion spring 83a holds the capstan arm 64 in a given angular home position. Attached to the shaft of the right worm wheel gear 30R is the rear floating pulley 77b having a radial blind slot disposed therein. A driving plate or wheel 66 is disposed below rear pulley 77b. Driving plate 66 includes a drive pin 72 which protrudes into the radial slot of pulley 77b.

In the front capstan arm pulley 77a and in the rear floating pulley 77b, there is disposed a retaining slot 73a, 73b for accepting a round driving member 79a, 79b, respectively. These driving members 79a, 79b are fixedly attached to a cable or driving means 78 at a specific, predetermined position on the cable. Front and rear spring adjustment clips 81a, 81b are disposed on either side of an extension spring means 85 which provides a means for applying a constant bias to keep one side of the cable 78 taut. Extension spring means 85 comprises an extension spring or other biasing means which closes the loop formed by cable 78. The cable 78, driving members 79a, 79b and extension spring 85 form a closed loop and are wrapped around the front and rear pulleys 77a, 77b, respectively.

The retaining slot 73a of the front capstan arm pulley 77a is set in a predetermined angular condition with respect to the cable 78. It will be appreciated that the front capstan arm pulley 77a, receives the first positive driving member 79a in the retaining slot. The driving means 79a and 79b are each received in the respective retaining slots 73a, 73b in front capstan arm pulley 77a and rear floating pulley 77b, respectively. Thus, the driving members 79a, 79b fix the rotation of each pulley 77a, 77b with respect to the other. This results in a precise timing relationship between the front capstan arm pulley 77a and the rear floating pulley 77b. In addition, because the front and rear pulley retaining slots 73a, 73b capture the associated drive members 79a, 79b, this provides an enhanced positive drive feature which further acts to maintain a precise timing relationship between the front and rear pulleys 77a, 77b.

In operation, the drive plate 66 with a protruding drive pin 72 rotates in a specific, predetermined direction. At a given angular rotation, the drive pin 72 contacts the inside edge of the slot on the rear floating pulley 77b which causes it to rotate in the same direction. Thus, pulley 77b drives the front capstan arm pulley 77a by means of the positive driving members 79b, 79a. This causes the capstan arm 64 to rotate at a predetermined time which is a function of the angular position of the positive drive members 79a, 79b.

At such a time dictated by overall system timing constraints, the pinch roller 62 contacts the capstan drive 60, at which point the motion of the capstan arm 64 stops. This causes the front capstan arm pulley 77a to stop rotating. However, the rear pulley 77b continues to turn causing extension spring 85 to be extended to a given length. This in turn exerts a force onto the pinch roller 62, thus biasing the tape against the capstan drive shaft 60 and causing the tape to be pulled through the system at a constant rate.

In the state wherein the extension spring 85 is extending, the cable 78 on the tension side of the pulley arrangement is forced to become somewhat shorter. In the prior art this situation would result in the slack side of the pulley arrangement becoming longer thereby causing the cable 78 to become very slack. This is a serious problem which, if not remedied, could cause the cable to fall off of the pulley. The solution to this problem is to provide torsion spring 83b which resides on top of the rear pulley 77b. The torsion spring 83b provides a means for applying a rotational force in the direction opposite to the slack side of the pulley 78. The torsion spring 83b preferably includes two legs. One of the legs is disposed so as to contact spring engagement pin 87b which is disposed on the top surface of the rear floating pulley 77b for contacting a leg of the torsion spring 83b. It will be appreciated that when the floating pulley 77b continues to rotate, the torsion spring 83b also rotates in the same direction. As this occurs, torsion spring 83b pushes on the slack side of the cable causing it to wrap on the floating pulley and thereby takes up all the slack in the cable 78.

The function of torsion spring 83a is to return the pinch roller arm at the appropriate time and also to hold it in a home position. Torsion spring also 83a provides a means for applying a bias or a rotational force in the opposite direction as the bias applied by the extension spring 85. this also enables floating pulley 77b to return to its home position.

The foregoing features of this embodiment provide an improved pinch roller biasing system which achieves a substantially constant bias on a tape through the capstan arm. This system also substantially eliminates slack in the capstan pulley cables and improves the timing and operation of the tape engagement system. In addition, the present system eliminates the use of belts and complex timing systems which take up a substantial amount of valuable space in prior art tape drive mechanisms. It has been found that a tape drive system incorporating the foregoing improved capstan biasing mechanism achieves a savings in space of up to 50% over prior art devices incorporating more complex timing systems.

An embodiment of the present invention includes means for preventing jamming of the drive system. In the event that one of the tape extraction roller blocks comes into contact with its tape positioning V-block before the other, springs 34L and 34R also act to prevent the end of travel contact from binding the motor rotation and adversely affecting seating of the later arriving tape extraction roller block with its tape positioning V-block.

In an embodiment where the device includes a helical-scan head drum assembly such as that shown diagrammatically at reference numeral 56, stationary means are provided for correcting the position of the tape 58 from the tilted plane of the helical-scan head drum assembly 56 to the vertical plane. These means engage the tape 58 prior to the end of travel of the tape extraction roller blocks 20L and 20R. As illustrated in FIG. 5, in a presently preferred embodiment, this means consists of a pair of fixed inclined pins 86, which may have their angles adjusted for optimum performance.

As a part of the engaging process performed by a presently preferred embodiment of the apparatus described herein, the tape 58 may also be loaded around a tension arm including a tension sensor. As can be seen from FIGS. 1, 2, 6a, and 6b, tension arm 90 is pivotally mounted on the top of frame 12, preferably on an assembly 92, which includes left tape positioning V-block 26L in a position so as to be engageable by cam member 94, located on cam wheel gear 96. As shown in FIGS. 1 and 2, cam wheel gear 96 may be driven by left worm gear 42, and is positioned such that cam member 94 will act to push tension arm 90 out of the way as the tape is brought into position by tape extraction roller block 20L.

Assembly 92 includes a pivot point 98, upon which tension arm 90 pivots. In a presently preferred embodiment, an "offset over-center" spring 100 is fastened at one of its ends 102 to an adjustment screw 104 located in a tapped hole in assembly 92. Spring 100 is fastened at its other end 108 to a tit 110 protruding at approximately a right angle from the body of tension arm 90 as shown in FIGS. 1 and 2. The offset over-center spring configuration allows a more constant force to be exerted on the tape by tension arm 90 over a wider range of tape tensions and hence angular positions of tape tension arm 90.

A permanent magnet 112 is mounted on tension arm 90 and communicates with Hall effect sensor 114 for providing a feedback signal for adjusting tape tension as is well known in the art.

In a presently preferred embodiment, a velocity transducer, which may include a rubber roller equipped with a magneto-resistive or optical encoder or other equivalent encoder, is mounted in a position which intercepts the engaged tape path. A presently preferred tension sensor may be a spring adjusted arm mounted on the base plate.

Once the mechanism of the present invention has engaged the tape as is shown in FIG. 2, the tape is in a "play" orientation. In order to fast forward or rewind the tape 58, the pinch roller arm 64 and tension arm 90 are moved out of their engaged positions. This is accomplished by reversing the direction of rotation of motor 48 and letting it execute a predetermined number of rotations. This action serves to cause cam member 94, located on cam wheel 96 to move tension arm 90 into a disengaged position. It also causes the pin 72 in driving wheel 66 to revolve towards the open groove 70. Torsion spring 68 causes driving wheel 66 to rotate towards its home position, thus moving pinch roller arm 64 out of its engaged position.

While presently-preferred embodiments of the present invention have been disclosed herein, those of ordinary skill in the art will be enabled, from the within disclosure, to configure embodiments which, although not expressly disclosed herein, nevertheless fall within the scope of the present invention. It is therefore intended that the scope of the present invention be limited only by the appended claims.

What is claimed is:

1. An improved tape drive system for extracting a magnetic tape from a cassette and for driving the tape with respect to a tape head, or the like including a bi-directional over running clutch means for enabling selected components of said tape drive system to rotate while other components are stationary comprising:

a worm wheel gear having an axis of rotation about a shaft and having at least one concentric slot disposed therein;

a timing gear disposed on said shaft substantially adjacent said worm wheel gear and having an axis of rotation about said shaft;

a reaction pin disposed on said timing gear, said reaction pin extending through said concentric slot and being capable of traveling within said concentric slot and effecting uniform rotation of said worm wheel gear and said timing gear upon contacting an end of said concentric slot;

detent clutch means for coupling said worm wheel gear and said timing gear and for selectively releasing said worm wheel gear and said timing gear upon application of a predetermined amount of torque to either of said coupled gears in a direction opposite a direction of rotation of said coupled gears; and torsion spring means disposed on said shaft for applying a predetermined amount of torque to said reaction pin when either of said gears rotates separately with respect to the other.

2. A n apparatus according to claim 1 wherein said torsion spring means comprises a torsion spring disposed on said shaft and has at least one end for engageably contacting said reaction pin to thereby apply a torque to said reaction pin in a direction opposite to a direction of travel of said reaction pin.

3. An apparatus according to claim 1 wherein said detent clutch means comprises a recess disposed in said timing gear for receiving a driving means of said worm wheel gear and wherein said driving means is selectively retained in said recess by a biasing means.

4. An apparatus according to claim 3 wherein said driving means engageably couples aid worm wheel gear and said timing gear, thereby causing said worm wheel gear and said timing gear to rotate in unison when said driving means is retained in said recess.

5. An apparatus according to claim 4 wherein said biasing means selectively uncouples said worm wheel gear and said timing gear from uniform rotation upon application of a predetermined amount of torque to either said worm wheel gear or said timing gear, said torque being applied in a direction opposite said uniform rotation.

6. An improved apparatus for driving a magnetic tape or the like with respect to a tape head for recording or playback including a bi-directional over running clutch for enabling the tape drive to have lost motion in both a clockwise or counterclockwise direction while at the same time enabling other functions relating to the tape drive to be stationary, comprising:
- a worm wheel gear disposed on a shaft for bi-directional rotation of said tape drive, said worm wheel gear having at least one concentric slot located therein;
- a timing gear disposed on said shaft for selective bi-directional rotation with respect to said worm wheel gear;
- means for selectively coupling said worm wheel gear and said timing gear in uniform rotation and for disengaging said worm wheel gear and said timing gear upon receipt of a predetermined amount of torque applied to either gear in a direction opposite to said uniform rotation; and
- reaction pin means disposed on said timing gear, said reaction pin means being received by said concentric slot and effecting uniform rotation of said worm wheel gear and said timing gear when said reaction pin means contacts an end of said slot.

7. A miniature clutch comprising:
- a worm wheel gear mounted on a shaft for bi-directional rotation about an axis of rotation, said worm wheel gear comprising an aperture and at least one concentric slot located therein;
- a driving member disposed within said aperture;
- a timing gear disposed on said shaft substantially adjacent said worm wheel gear, said timing gear capable of selective bi-directional rotation with respect to said worm wheel gear and comprising a recess located in an upper surface thereof for receiving said driving member;
- a biasing member mounted to said worm wheel gear and acting upon said driving member to selectively retain said driving member in said recess, said worm wheel gear and said timing gear being coupled in uniform rotation when said driving member is retained in said recess
- a first reaction pin disposed on said timing gear and extending through said concentric slot located in said worm wheel gear, said first reaction pin capable of traveling within said concentric slot and effecting uniform rotation of said worm wheel gear and said timing gear upon contacting an end of said concentric slot;
- a second reaction pin disposed on said worm wheel gear; and
- a torsion spring disposed on said shaft for applying a predetermined amount of torque to said first and second reaction pins when either of said gears rotates separately with respect to the other.

* * * * *